J. MILLS.
Dumping-Wagons

No. 154,704. Patented Sept. 1, 1874.

Witnesses: Harry Smith
Thomas McIlvain

James Mills
by his attys.
Howson and Son

UNITED STATES PATENT OFFICE.

JAMES MILLS, OF WILMINGTON, DELAWARE, ASSIGNOR TO HIMSELF AND PHILIP COMBS, OF SAME PLACE.

IMPROVEMENT IN DUMPING-WAGONS.

Specification forming part of Letters Patent No. 154,704, dated September 1, 1874; application filed June 27, 1874.

*To all whom it may concern:*

Figure 1:
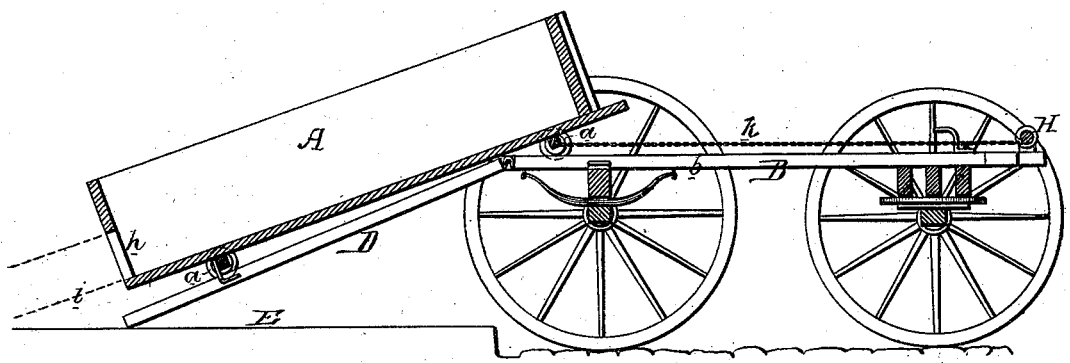

Be it known that I, JAMES MILLS, of Wilmington, Delaware, have invented an Improved Dumping-Wagon, of which the following is a specification:

The main object of my invention is to discharge coal directly from a wagon across the intervening sidewalk into the cellar-way of a building; and I attain this object by mounting the wagon-body A upon the wheels $a$, adapted to ways on the truck B, and to inclined bars D, hooked to the rear end of the truck and resting upon the sidewalk E, as shown in the sectional elevation, Figure 1, of the accompanying drawing, so that the said wagon-body can be wheeled back from the truck and across the sidewalk, and at the same time so inclined that the coal will be discharged from the same by its own gravity directly into the cellar-way. The truck B may be of the most simple construction, and may or may not be provided with springs.

Figure 2:
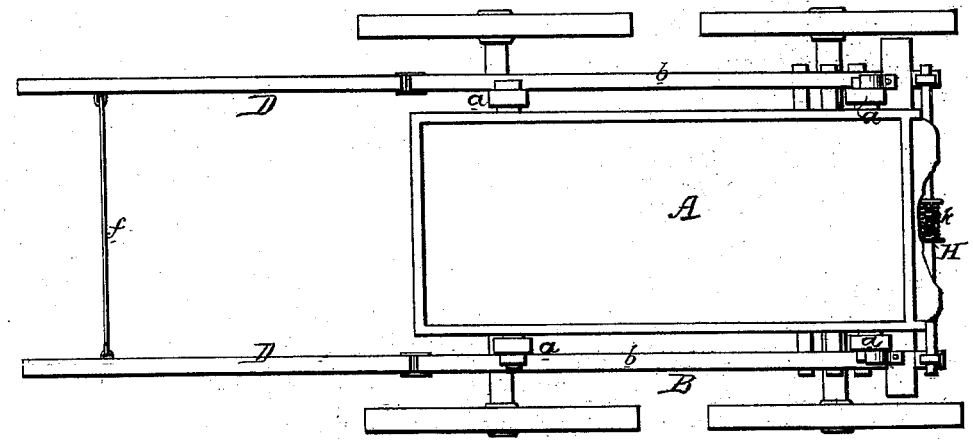

In the present instance the front and rear axles are connected together by parallel bars $b\ b$, which form the ways for the flanged wheels $a$ of the wagon-body, and which take the place of the ordinary truck-frame. (See plan view, Fig. 2.) The bars D are, in the present instance, hooked to the rear ends of the bars $b\ b$ of the truck, to which, however, they may be otherwise secured, and they are maintained at a proper distance apart from each other, at their outer ends, by a detachable cross-stay, $f$. When not required for use the said bars D and their stay $f$ can be disconnected, and suspended from or otherwise attached to the truck. The wagon-body has an opening, $h$, at its rear end, through which the load is discharged, and I propose to attach a spout or chute, $i$, to the body directly opposite this opening, as indicated by dotted lines in Fig. 1, when it is desired to conduct the coal or other material to a more remote point than can be reached by the body itself. When the load has been discharged from the wagon-body, the latter is drawn up the inclined ways D and onto the truck by a rope or chain, K, attached to its front end, and arranged to be wound upon a windlass, H, at the front of the truck. The windlass and rope may also be used to advantage in lowering the loaded body down the inclined ways D.

My invention, it will be evident, can be applied to two-wheeled carts, as well as to wagons of the character described.

I claim as my invention—

In a dumping wagon or cart, the body A, mounted upon rollers adapted to ways $b$ on the truck, and to inclined bars D, detachably secured to the rear ends of and forming continuations of the said ways, all combined substantially as and for the purpose specified.

In testimony whereof I have signed my name to this specification in the presence of two subscribing witnesses.

JAMES MILLS.

Witnesses:
E. B. FRAZER,
THOS. D. WEBB.